United States Patent
Jin (10) Patent No.: US 10,208,504 B2
(45) Date of Patent: Feb. 19, 2019

(54) STRUCTURE FOR FIXING TENT SUPPORT LEGS

(71) Applicant: Luhua (Xiamen) Trading Co., Ltd., Xiamen (CN)

(72) Inventor: Juyoung Jin, Xiamen (CN)

(73) Assignee: Xiamen Innovation Metal Products Co., LTD., Xiamen (CN)

(*) Notice: Subject to any disclaimer, the term of this patent is extended or adjusted under 35 U.S.C. 154(b) by 0 days.

(21) Appl. No.: 15/606,759

(22) Filed: May 26, 2017

(65) Prior Publication Data
US 2017/0342738 A1    Nov. 30, 2017

(30) Foreign Application Priority Data

May 26, 2016    (CN) .................... 2016 2 0487657 U (51) Int. Cl.
| | | |
|---|---|---|
| *E04H 15/62* | (2006.01) | |
| *E04H 15/64* | (2006.01) | |
| *F16B 7/22* | (2006.01) | |
| *E04H 15/32* | (2006.01) | |
| *F16B 21/09* | (2006.01) | |

(52) U.S. Cl.
CPC ............. *E04H 15/62* (2013.01); *E04H 15/64* (2013.01); *F16B 7/22* (2013.01); *E04H 15/32* (2013.01); *F16B 21/09* (2013.01)

(58) Field of Classification Search
CPC ......... E04H 15/60; E04H 15/62; E04H 15/64; E04H 15/54
See application file for complete search history.

(56) References Cited

U.S. PATENT DOCUMENTS

| | | | | | |
|---|---|---|---|---|---|
| 3,539,234 | A * | 11/1970 | Rapata | .................... | F16C 11/06 384/203 |
| 4,782,846 | A * | 11/1988 | Ting | ....................... | E04H 15/62 135/118 |
| 5,333,634 | A * | 8/1994 | Taylor | .................... | E04H 15/28 135/118 |
| 5,615,699 | A * | 4/1997 | Lee | ......................... | E04H 15/64 135/118 |
| 5,954,077 | A * | 9/1999 | Wain | ...................... | E04H 15/64 135/119 |
| 6,681,786 | B2 * | 1/2004 | Ju | .......................... | E04H 15/48 135/118 |

(Continued)

*Primary Examiner* — David R Dunn
*Assistant Examiner* — Danielle Jackson
(74) *Attorney, Agent, or Firm* — Morgan, Lewis & Bockius LLP (57) ABSTRACT

A structure for fixing tent support legs comprise a connection sleeve which encompasses a bottom end portion of a support leg, and a leg sleeve provided with a first groove. The structure also includes a hook comprising a first end coupled with a tent fabric and a second end engaged and coupled with the leg sleeve. The first groove is configured to engage and couple the connection sleeve internally. The first groove is formed in such a way that a first opening at a first end of the first groove comprises a stop plate which locks the connection sleeve into the first groove. Moreover, the periphery of the connection sleeve comprises a plurality of bosses configured to engage the first groove, and a top portion of the bosses engage a bottom of the stop plate thereby coupling the connection sleeve to the leg sleeve.

16 Claims, 6 Drawing Sheets

(56) References Cited

U.S. PATENT DOCUMENTS

| | | | |
|---|---|---|---|
| 8,763,621 B2* | 7/2014 | Jin | E04H 15/44 |
| | | | 135/115 |
| 2008/0142063 A1* | 6/2008 | Lah | E04H 15/64 |
| | | | 135/120.3 |
| 2016/0060897 A1* | 3/2016 | Baoqing | E04H 15/60 |
| | | | 135/146 |
| 2017/0022732 A1* | 1/2017 | Jin | E04H 15/425 |

* cited by examiner

STRUCTURE FOR FIXING TENT SUPPORT LEGS

CROSS-REFERENCE(S) TO RELATED APPLICATION

The present application claims priority to Chinese Invention Application CN 201620487657.X filed on May 27, 2016, the entire contents of which is incorporated herein for all purposes by this reference.

TECHNICAL FIELD

The present disclosure generally relates to a structure for fixing tent support legs.

BACKGROUND

In general, a tent is a temporary residence fixed to the ground which is configured to provide a shield against the elements and environment. A tent can be disassembled into a several component pieces at any time and transported to another location. Assembled on site, a tent can be rapidly and conveniently erected after a user has become familiarized with the assembly method and the components of the tent.

Conventional tents utilize a sub-optimal configuration to fix the tent's support legs. One conventional apparatus to fix a tent's support legs involves inserting a 'P'-shaped connection member into an end of a tent frame leg and inserting a 'P'-shaped connection member into an end of the frame. This is disadvantageous as the tent is relatively difficult to erect, and can be easily dismantled when the tent legs are not firmly secured or a strong wind occurs. Another conventional apparatus directly locks the tent leg into an end of the tent frame leg using a connection member. However, this is also unsatisfactory because it is relatively difficult to erect and disassemble, and furthermore easily becomes unintentionally dismantled when the tent legs are not firmly secured or are subjected to wind. Given this background, improved structures for fixing tent support legs are needed in the art.

The information disclosed in this background section is only for enhancement of understanding of the general background of the invention and should not be taken as an acknowledgement or any form of suggestion that this information forms the prior art already known to a person skilled in the art.

SUMMARY

Advantageously, the structure for fixing tent support legs detailed in the present disclosure address the shortcomings in the prior art detailed above.

Various aspects of the present disclosure are directed to providing a structure for fixing tent support legs, which utilizes a simple structure that is easily assembled thereby decreasing the work intensity of the user, and a structure that securely fixes the tent legs so that the tent is not easily dismantled by wind, leading to a structure that yields a high stability and build quality.

In accordance with an aspect of the present disclosure, the above and other objects can be accomplished by the provision of a structure for fixing tent support legs, comprising a connection sleeve which encompasses a bottom end portion of a support leg, and a leg sleeve provided with a first groove. The structure also includes a hook comprising a first end is coupled with a tent fabric and a second end is engaged and coupled with the leg sleeve.

The first groove is configured to engage and couple the connection sleeve internally. The first groove is formed in such a way that a first opening at a first end of the first groove comprises a stop plate which locks the connection sleeve into the first groove. Moreover, the periphery of the connection sleeve comprises a plurality of bosses configured to engage the first groove. A top portion of the bosses engage a bottom of the stop plate thereby coupling the connection sleeve to the leg sleeve.

In some embodiments, a first end of the leg sleeve comprises a second groove, and a cylinder is disposed in the second groove and configured to engage the hook. Moreover, the first end of the leg sleeve is coupled with a connection ring.

The structure for fixing tent support legs according to an exemplary embodiment of the present disclosure is provided to cure the disadvantages of the prior art while having the advantages of a simple and convenient assembly structure thereby decreasing the work intensity of a user, and utilizes high structural stability to prevent dismantling during a strong wind or when the tent legs are not properly secured.

The methods and apparatuses of the present disclosure have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawing and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the present invention as defined by the appended claims.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject" and "user" are used interchangeably herein.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and or "comprising," when used in this specification, specify the presence of stated features, integers, steps, operations, elements, and or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

An aspect of the present disclosure is directed to provide a structure for fixing tent support legs. Referring to FIG. 1 to FIG. 6, the structure for fixing a tent support leg comprises connection sleeve 10 which encompasses a bottom end portion of a support leg 1, and a leg sleeve 20 provided with a first groove 21. The structure also includes a hook 30 comprising a first end coupled with a tent fabric and a second end engaged and coupled with the leg sleeve 20.

Figure 1:
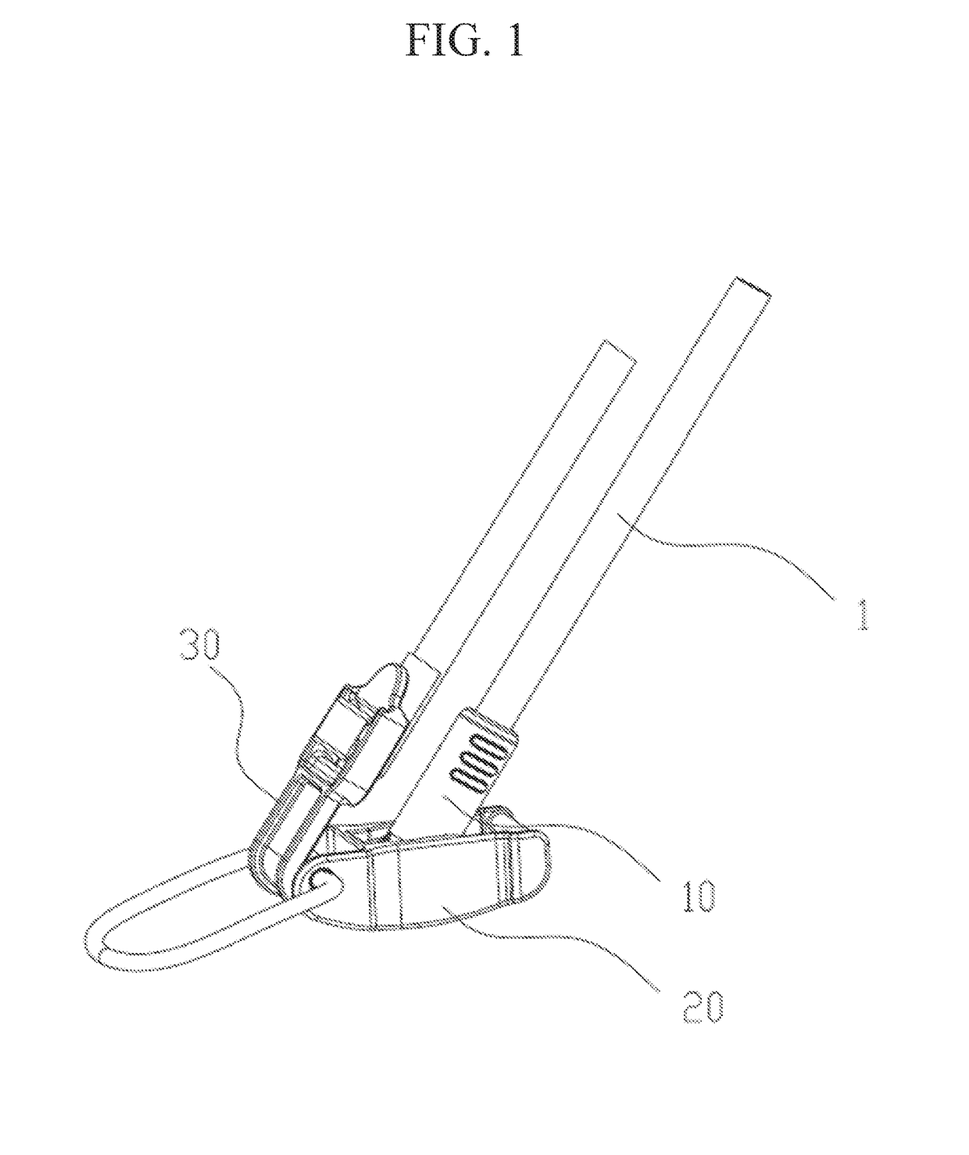
FIG. 1 is a schematic diagram of a combined state according to an exemplary embodiment of the present disclosure.
Figure 2:
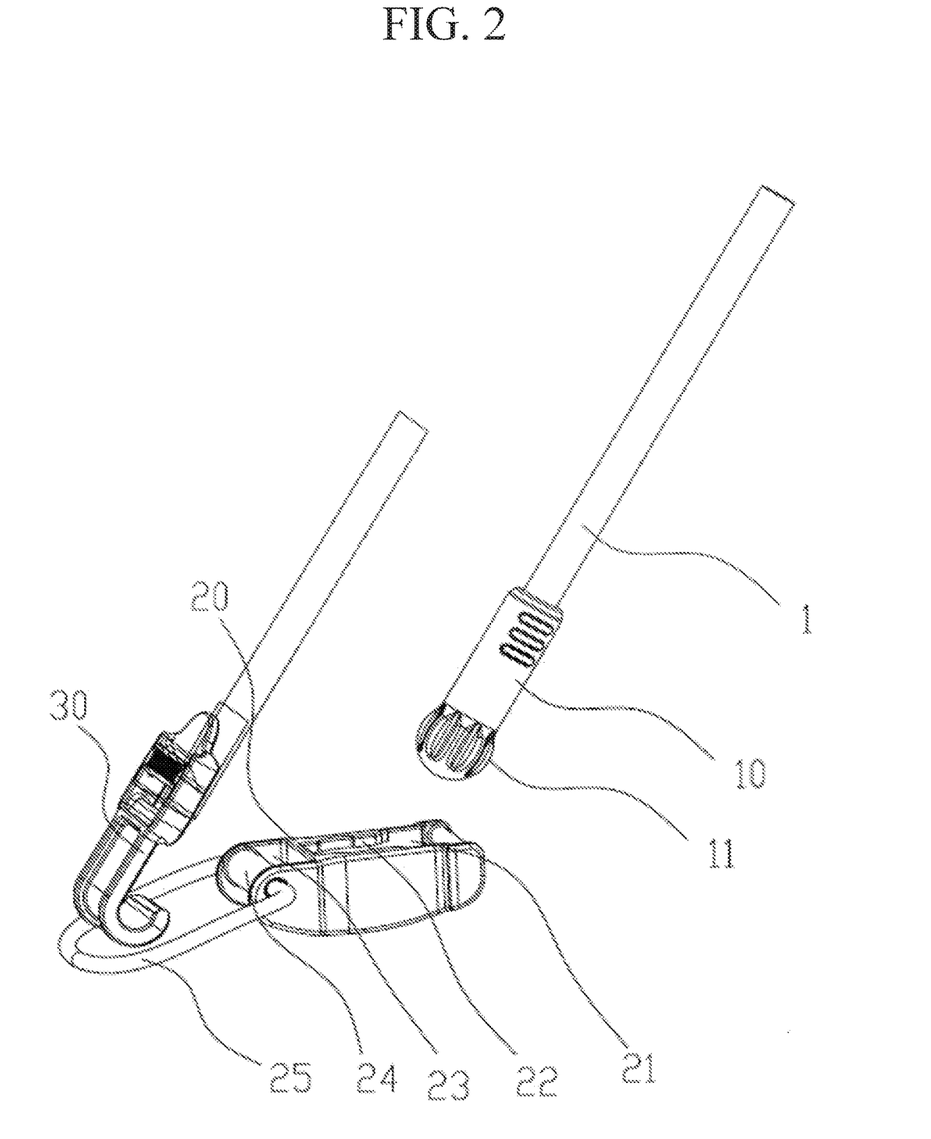
FIG. 2 is a schematic diagram according to an exemplary embodiment of the present disclosure when the device is separated.
Figure 3:
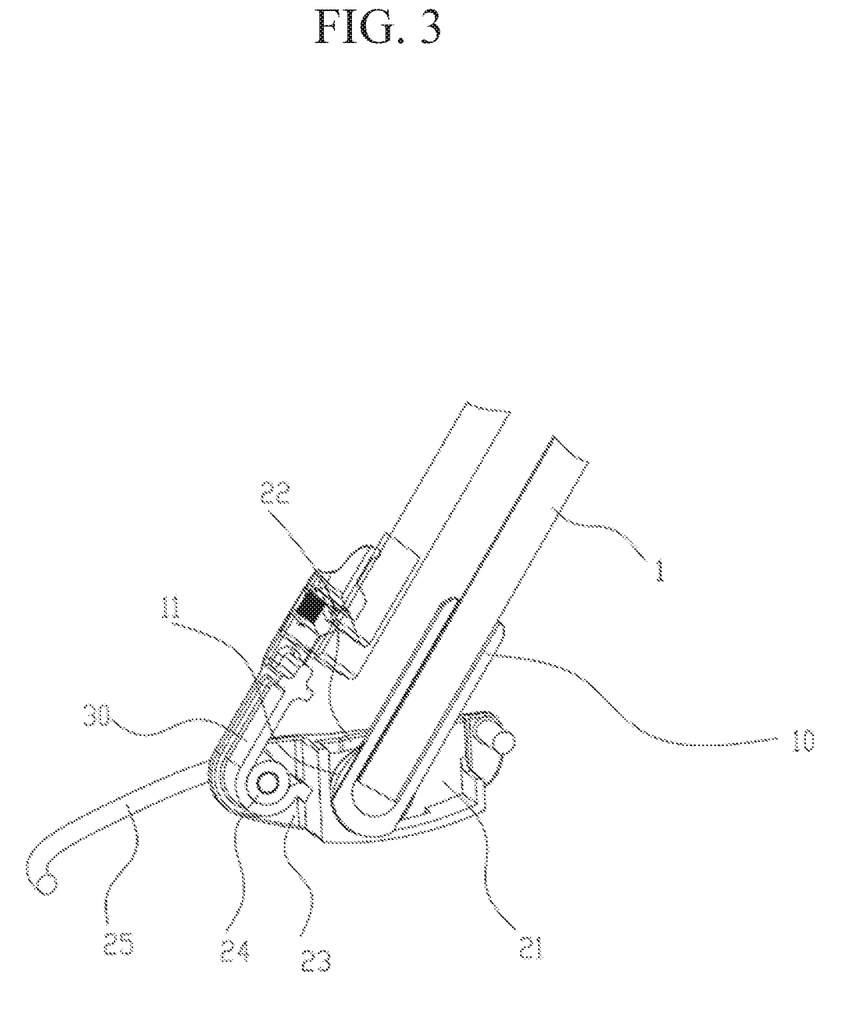
FIG. 3 is a cross-sectional view of a combined state according to an exemplary embodiment of the present disclosure.
Figure 4:
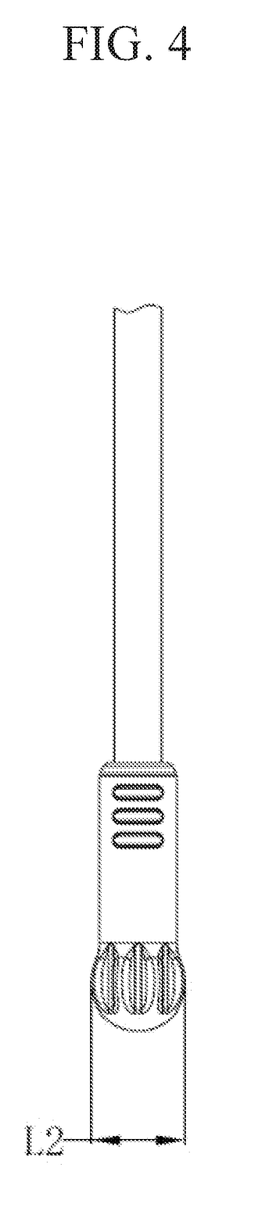
FIG. 4 illustrates the engagement between a support leg and a connection sleeve according to an exemplary embodiment of the present disclosure.

The first groove 21 is configured to engage and couple the connection sleeve 10 internally. The first groove 21 is formed in such a way that a first opening at a first end of the first groove comprises a stop plate 22 is disposed at the first groove to narrow the opening of the first groove at a first portion thereof (e.g., left side of the first groove 21 in FIG. 5). When in use the stop plate which locks the connection sleeve 10 into the first groove 21 as shown in FIG. 2 and FIG. 3. The opening of the first groove at a second portion thereof(e.g., right side of the first groove 21 in FIG. 5) is wider than the opening at the first portion. In some embodiments, the stop plate is disposed at the first portion of the first groove. Moreover, the periphery of the connection sleeve 10 comprises a plurality of bosses 11 configured to engage the first groove 21, for instance, and a top portion of the bosses 11 engage a bottom of the stop plate 22 thereby coupling the connection sleeve 10 to the leg sleeve 20. The bosses 11 are formed as an annular protrusion with an external diameter L2, as shown in FIG. 4. In another embodiment, the bosses 11 are formed integrally.

In some embodiments, a first end of the leg sleeve 20 comprises a second groove 23. A cylinder 24 is disposed in the second groove 23 and is configured to engage the hook 30. Moreover, the first end of the leg sleeve 20 is coupled with a connection ring 25. The connection ring 25 engages with a ground nail (not shown) thereby fixing the structure to the ground. As illustrated in FIG. 2, the leg sleeve 20 is coupled with the connection ring 25 through the cylinder 24. Although FIG. 2 illustrates a single ring, it will be appreciated that ring 25 can in fact be a plurality of interlocking rings in other embodiments not shown.

Figure 5:
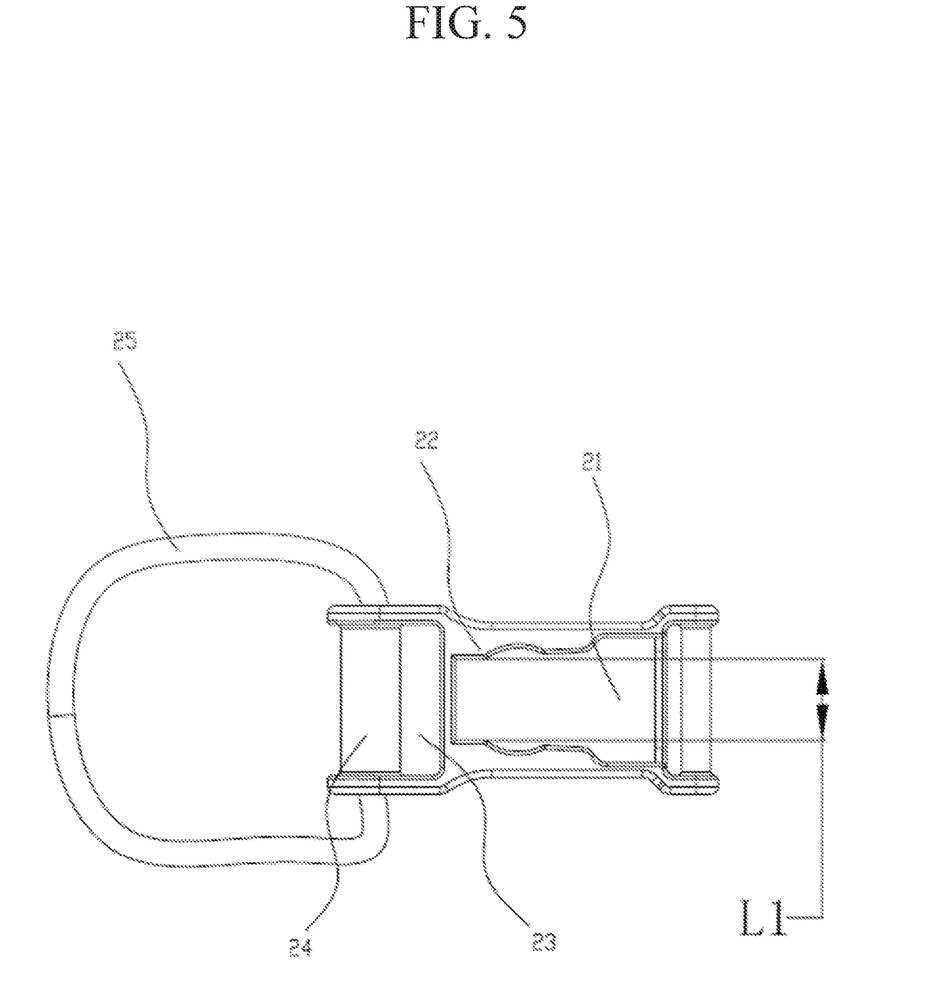
FIG. 5 is a top view of a leg sleeve according to an exemplary embodiment of the present disclosure.
Figure 6:
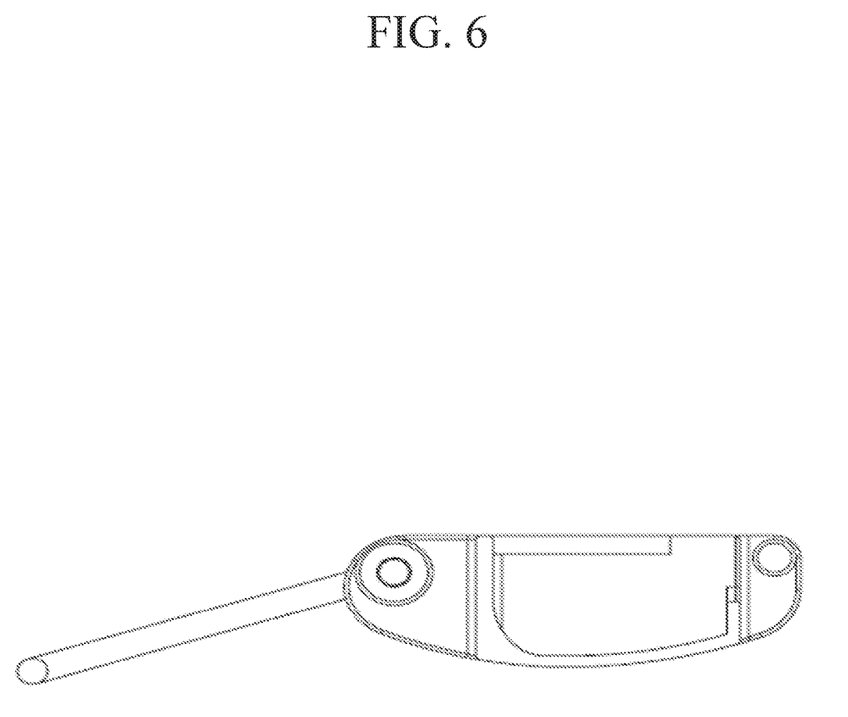
FIG. 6 is a cross-sectional view of a leg sleeve according to an exemplary embodiment of the present disclosure.

During operational use, the connection sleeve provided with the bosses on one end is inserted into the groove at the end without the stop plate, subsequently the connection sleeve slides such that the bosses are beneath the stop plate. In the present embodiment, a pair of stop plates 22 are respectively disposed on a first side of the first groove 21 and a second side of the first groove 21. The distance between the first stop plate 22 and the second stop plate 22 is distance L1, as shown in FIG. 5. Distance L1 is formed in such a way that L1 is smaller than L2, which ensures the support structure leg (through the connecting sleeve) will not leave the first groove 21 due to its elastic force.

Accordingly, a structure for fixing tent support legs according to an exemplary embodiment of the present disclosure achieves the advantages of a simple and convenient assembly structure to decrease the work intensity of the user, and utilizes high structural stability to prevent being dismantled during a strong wind or when the tent legs are not properly secured.

For convenience in explanation and accurate definition in the appended claims, the terms "upper", "lower", "up", "down", "upwards", "downwards", "inner", "outer", "inside", "outside", "inwardly", "outwardly", "interior", "exterior", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various alternatives and modifications thereof. It is intended that the scope of the invention be defined by the Claims appended hereto and their equivalents.

What is claimed is:

1. A structure for fixing a tent support leg, comprising:
   a connection sleeve to couple with a bottom end portion of the tent support leg, wherein a first end portion of the connection sleeve has a first external diameter; and
   a leg sleeve comprising:
      a first groove having an opening; and
      a first stop plate disposed at a first side of the first groove and a second stop plate disposed at a second side of the first groove, wherein a distance between the first and the second stop plates is smaller than the first external diameter of the first end portion of the connection sleeve such that (i) the opening of the first groove at a first portion thereof has a width less than the first external diameter of the first end portion of the connection sleeve to prevent disengagement of the first end portion of the connection sleeve from the first groove, and (ii) the opening of the first groove at a second portion thereof has a width greater than the first external diameter of the first end portion of the connection sleeve to allow insertion of the first end portion of the connection sleeve into the first groove, wherein the first end portion of the connection sleeve is to be inserted into the first groove through the opening at the second portion thereof and then slides such that the first end portion of the connection sleeve is beneath the first and second stop plates, and wherein the connection sleeve comprises a plurality of bosses disposed circumferentially around the first end portion thereof to engage the first groove, wherein when in use, a top portion of the bosses engages bottoms of the first and second stop plates, thereby coupling the connection sleeve to the leg sleeve.

2. The structure according to claim 1, wherein the plurality of bosses forms an annular protrusion.

3. The structure according to claim 1, wherein the plurality of bosses is integrally formed onto the connection sleeve.

4. The structure according to claim 1, further comprising:
a hook comprising a first end portion to couple with a tent fabric and a second end portion removably coupled with the leg sleeve.

5. The structure according to claim 4, wherein the leg sleeve comprises a second groove, and a cylinder disposed in the second groove to engage the hook.

6. The structure according to claim 5, wherein the leg sleeve further comprises a connection ring that passes through the cylinder.

7. The structure according to claim 6, wherein the connection ring is a single ring.

8. The structure according to claim 6, wherein the connection ring is a plurality of interlocking rings.

9. The structure according to claim 1, wherein no stop plate is disposed at the second portion of the first groove.

10. The structure according to claim 1, wherein the first and second stop plates are symmetric with respect to each other.

11. A structure for fixing a tent support leg, comprising:
a connection sleeve to couple with a bottom end portion of the tent support leg, wherein a first end portion of the connection sleeve has a first external diameter; and
a leg sleeve comprising:
a first side wall, a second side wall, and a bottom wall connecting bottoms of the first side wall and the second side wall to form a first groove the first groove having a top opening; and
a first stop plate disposed in the first groove at a top of the first side wall and a second stop plate disposed in the first groove at top of the second side wall, wherein a distance between the first and the second stop plates is smaller than the first external diameter of the first end portion of the connection sleeve such that (i) the top opening of the first groove at a first portion thereof has a width less than the first external diameter of the first end portion of the connection sleeve to prevent disengagement of the first end portion of the connection sleeve from the first groove, and (ii) the top opening of the first groove at a second portion thereof has a width greater than the first external diameter of the first end portion of the connection sleeve to allow insertion of the first end portion of the connection sleeve into the first groove,
wherein the first end portion of the connection sleeve is to be inserted into the first groove through the top opening at the second portion thereof and then slides such that the first end portion of the connection sleeve is beneath the first and second stop plates.

12. The structure according to claim 11, wherein the connection sleeve is sleeved on the bottom end portion of the tent support leg.

13. The structure according to claim 11, wherein no stop plate is disposed at the second portion of the first groove.

14. The structure according to claim 11, wherein the first and second stop plates are symmetric with respect to each other.

15. The structure according to claim 11, further comprising:
a hook comprising a first end portion to couple with a tent fabric and a second end portion removably coupled with the leg sleeve.

16. The structure according to claim 15, wherein the leg sleeve comprises a second groove, and a cylinder disposed in the second groove to engage the hook.

* * * * *